United States Patent [19]

Rieder

[11] E Re. 31,522

[45] Reissued Feb. 14, 1984

[54] SALT OF A POLYAMIDE AND FUNCTIONAL FLUID CONTAINING SAME

[75] Inventor: Walter E. Rieder, Arcadia, Calif.

[73] Assignee: Cincinnati Milacron Inc., Cincinnati, Ohio

[21] Appl. No.: 481,494

[22] Filed: Apr. 1, 1983

Related U.S. Patent Documents

Reissue of:

[64] Patent No.: 4,374,741
Issued: Feb. 22, 1983
Appl. No.: 285,575
Filed: Jul. 21, 1981

[51] Int. Cl.[3] ..... C10M 1/06; C10M 1/20; C10M 1/36; C08F 36/00

[52] U.S. Cl. ..... 252/34; 252/47.5; 252/49.3; 252/51.5 A; 72/42; 260/404.5; 525/420; 528/335; 528/337; 528/341; 528/346; 528/347

[58] Field of Search ..... 252/33.6, 34, 47.5, 252/49.3, 51.5 A; 72/42; 260/404.5 PA, 404.5 Q; 562/448, 451, 455, 507, 564; 525/420; 528/335, 337, 341, 346, 347

[56] References Cited

U.S. PATENT DOCUMENTS

| | | | |
|---|---|---|---|
| 3,804,763 | 4/1974 | Meinhardt | 252/51.5 A |
| 3,992,312 | 11/1976 | Genjida et al. | 252/77 |
| 4,107,061 | 8/1978 | Sturwold et al. | 252/49.3 |
| 4,239,635 | 12/1980 | Rieder | 252/34 |
| 4,273,664 | 6/1981 | Brandolese | 252/49.3 X |

FOREIGN PATENT DOCUMENTS

| | | |
|---|---|---|
| 574713 | 1/1946 | United Kingdom . |
| 615954 | 1/1949 | United Kingdom . |
| 1035923 | 7/1966 | United Kingdom . |
| 1184949 | 3/1970 | United Kingdom . |
| 1304865 | 1/1973 | United Kingdom . |
| 1463106 | 2/1977 | United Kingdom . |
| 2011421 | 5/1982 | United Kingdom . |

OTHER PUBLICATIONS

Australian Patent Application No. 80733/75, lapsed, not published, filed Apr. 21, 1975.

Chemical Abstracts, vol. 71, p. 27, 1969, Abstract Number 3935k.

*Primary Examiner*—W. J. Shine

*Attorney, Agent, or Firm*—Donald Dunn

[57] ABSTRACT

Polyoxyalkylene polyamide lubricants having a terminal carboxylic acid group and a terminal amine group in the same molecule and a degree of polymerization of from 2 to 10 and salts thereof are provided. Stable aqueous based compositions are prepared from the polyamide or its salt, that are useful metal working and hydraulic fluids.

32 Claims, No Drawings

SALT OF A POLYAMIDE AND FUNCTIONAL FLUID CONTAINING SAME

Matter enclosed in heavy brackets [ ] appears in the original patent but forms no part of this reissue specification; matter printed in italics indicates the additions made by reissue.

This invention pertains to water soluble or dispersible polyamides having a terminal carboxylic acid group and a terminal amine group in the same molecule and salts thereof, their use in lubricants and aqueous functional fluid (e.g. metal working fluid) compositions containing such polyamides or their salts.

BACKGROUND

Aqueous based and non-aqueous functional fluids have been employed in such diverse uses as hydraulic fluids, metal working fluids, heat transfer fluids, electronic coolants, damping fluids and lubricants. To meet such diverse uses functional fluids are often tailored to have sets of properties and performance characteristics specific to the intended use of the fluid. Among the principle uses of functional fluids is their application as hydraulic fluids and metal working fluids. In metal working applications they find use in drilling, tapping, drawing, turning, milling, broaching, grinding, bending, rolling and the like metal working operations. The stability and lubricating characteristics of the functional fluid as a whole and the various components of the fluid play a major role in the performance and utility of the fluid in hydraulic and metal working applications. High stability for the fluid and its components during storage and use as well as high lubricity of the fluid are important and desirable characteristics in the use of the fluid as a hydraulic fluid or metal working fluid.

In recent years aqueous based functional fluids have gained in importance because of their safety, environmental, disposal, flammability, performance and economic advantages over non-aqueous functional fluids. These advantages are particularly significant in view of the strong emphasis currently being placed on safety and environmental considerations, especially in metal working operations. The economic advantages of aqueous functional fluids over non-aqueous functional fluids have become important in view of the supply problems and increasing price of non-aqueous functional fluids.

However, to derive the greatest benefit from these advantages of aqueous functional fluids, such fluids should exhibit high stability during storage and use, as well as provide a high degree of lubricity. Thus the aqueous functional fluid should be highly resistant to separation of one or more components from the mixture and resistant to undesirable breakdown (e.g. degradation) of the components of the fluid, especially undesirable degradation of a lubricant component of the fluid. Separation and undesirable degradation of components (especially a lubricant component) of an aqueous functional fluid reduces the effectiveness and useful life of the fluid leading to such undesirable effects as (1) excessive wear of metallic components of hydraulic systems (e.g. pumps and valves) and metal working equipment (e.g. cutting tools, rolls and dies) and (2) metal working products which have poor surface finish and incorrect dimensions. Although many aqueous functional fluids have been proposed by the art and a number of such fluids have been and are being used today in such applications as hydraulics and metal working those fluids have exhibited stability and/or lubricity problems which tend to limit or preclude their effective utilization. Improvements in aqueous functional fluids have therefore been continuously sought by persons skilled in the art.

It is therefore an object of this invention to overcome the disadvantages of prior art aqueous functional fluids and provide a stable, lubricating aqueous functional fluid.

Another object of this invention is to provide a novel lubricant for use in forming a stable, lubricating aqueous functional fluid.

It is a further object of this invention to provide a stable, lubricating aqueous functional fluid containing a novel polyamide lubricant.

SUMMARY OF THE INVENTION

It has now been discovered that the above objects and others, as will be apparent to those skilled in the art from the following disclosure and claims, can be achieved by (1) a polyamide derivative of a polyoxyalkylene diamine wherein the polyamide has (a) a single terminal carboxylic acid group and a single terminal amine group in the same molecule and (b) a degree of polymerization of from 2 to 10 and the salts of the polyamide formed by the salt of the terminal carboxylic acid group, the terminal amine group or the terminal carboxylic acid and terminal amine groups of the polyamide and (2) an aqueous functional fluid composition comprising (a) water and (b) a lubricant compound selected from the group consisting of a water soluble or dispersible polyamide derivative of a polyoxyalkylene diamine wherein the polyamide has a single terminal carboxylic acid group and a single terminal amine group in the same molecule and a degree of polymerization of from 2 to 10, a water soluble or dispersible salt of a water soluble of dispersible polyamide derivative of a polyoxyalkylene diamine wherein the polyamide has a single terminal carboxylic acid group and a single terminal amine group in the same molecule and a degree of polymerization of from 2 to 10 or a water soluble or dispersible salt of a water insoluble polyamide derivative of a polyoxyalkylene diamine wherein the polyamide has a single terminal carboxylic acid group and a single terminal amine group in the same molecule and a degree of polymerization of from 2 to 10.

DESCRIPTION OF THE INVENTION

There is now provided in accordance with this invention a polyamide advantageously exhibiting lubricity properties and having the formula

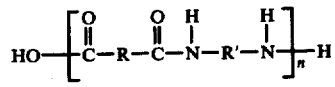

(I)

wherein:

R is a divalent aliphatic, aromatic, arylaliphatic, alkylaromatic, cycloaliphatic, heteroaliphatic having oxygen or sulfur hetero chain atoms, heterocyclic having oxygen, sulfur or nitrogen hetero ring atoms or bicyclic radical or the halogenated derivatives thereof, R′ is a divalent polyoxyalkylene homopolymer or copolymer radical and n is 2 to 10 and the salts of said polyamide formed by the terminal carboxylic acid group, the terminal amine group or both the terminal carboxylic acid and terminal amine groups of the polyamide, said polyamide and its salts having an average molecular weight of not greater than about 50,000. Further there is provided in accordance with this invention an aqueous functional fluid composition comprising (a) water and (b) a lubricant compound selected from the group consisting of a water soluble or dispersible polyamide derivative of a polyoxyalkylene diamine, a water soluble or dispersible salt of a water soluble or dispersible polyamide derivative of a polyoxyalkylene diamine or a water soluble or dispersible salt of a water insoluble polyamide derivative of a polyoxyalkylene diamine wherein the polyamide derivative of a polyoxyalkylene diamine has the following formula

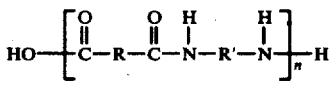

(I)

where

R is a divalent aliphatic, aromatic, arylaliphatic, alkylaromatic, cycloaliphatic, heteroaliphatic having oxygen or sulfur hetero chain atoms, heterocyclic having oxygen, sulfur or nitrogen hetero ring atoms or bicyclic radical or the halogenated derivatives thereof, R' is a divalent polyoxyalkylene homopolymer or copolymer radical and n is 2 to 10, said polyamide and the water soluble or dispersible salts thereof having an average molecular weight of not greater than about 50,000, the water soluble or dispersible salts being formed by the terminal carboxylic acid group, the terminal amine group or both the terminal carboxylic acid and terminal amine groups of the polyamide.

In a preferred practice of the polyamide, polyamide salt and the aqueous functional fluid composition of this invention, wherein the polyamide and the polyamide moiety of the salt thereof is given by formula (I) R is a $C_2$–$C_{12}$ alkylene, $C_2$–$C_{10}$ alkenylene, phenylene, $C_4$–$C_6$ cycloaliphatic, mono to di ($C_1$ to $C_4$ alkyl) substituted phenylene, phenyl substituted $C_2$–$C_{10}$ alkylene, phenylene di ($C_1$ to $C_3$ alkylene), heteroaliphatic having one to two oxygen or sulfur heterochain atoms and 2 to 10 carbon atoms, heterocyclic having one to two oxygen, sulfur or nitrogen hetero ring atoms and from 5 to 6 atoms in the ring divalent radical or a divalent radical residue obtained by removal of both carboxylic acid groups from a dimerized ethylenically unsaturated $C_8$ to $C_{26}$ fatty acid and R' is a divalent polyoxyalkylene homopolymer radical having 2 to 4 carbon atoms in the oxyalkylene group and an average molecular weight of from 72 to 2000 or a divalent polyoxyalkylene copolymer radical having 2 to 4 carbon atoms in the oxyalkylene groups and an average molecular weight of from 86 to 2000.

The salts of the terminal carboxylic acid group of the polyamide, more particularly the polyamide according to formula (I), of this invention are preferred in the practice of the polyamide and aqueous functional fluid composition of this invention.

The aqueous functional fluid composition of this invention exhibits advantageous lubricity, stability, safety, environmental and disposal characteristics.

Polyamides according to this invention are useful in metal working fluids and hydraulic fluids to provide or increase lubrication. Aqueous functional fluids in accordance with this invention are useful as metal working fluids in metal working processes such as for example milling, drilling, tapping, grinding, turning, drawing, reaming, punching, spinning and rolling.

Various embodiments of (a) the polyamide according to formula (I) and salts thereof, (b) the aqueous functional fluid comprising water and a lubricant that is a water soluble or dispersible polyamide according to formula (I), (c) the aqueous functional fluid comprising water and a lubricant that is a water soluble or dispersible salt of a water soluble or dispersible polyamide according to formula (I) and (d) the aqueous functional fluid comprising water and a water soluble or dispersible salt of a water insoluble polyamide according to formula (I) of this invention may be practiced by one skilled in the art. As examples of such embodiments there include polyamides, salts of polyamides, aqueous functional fluids comprising water and a water soluble or dispersible polyamide and aqueous functional fluids comprising water and a water soluble or dispersible salt of a water soluble or dispersible or insoluble polyamide, said polyamides and the polyamide moiety of said salts being according to formula (I) wherein (1) R is a divalent aliphatic radical, preferably a divalent aliphatic hydrocarbon radical and more preferably a $C_2$ to $C_{12}$ alkylene or $C_2$ to $C_{10}$ alkenylene radical, (2) R is a divalent aromatic radical, preferably a phenylene or naphthylene radical, (3) R is a divalent alkylaromatic radical, preferably a mono to di ($C_1$ to $C_4$ alkyl) substituted phenylene radical, (4) R is a divalent arylaliphatic radical, preferably a phenyl substituted $C_1$ to $C_{10}$ divalent aliphatic radical or phenylene dialkylene radical having 1 to 3 carbon atoms in the alkylene group

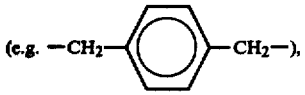

(e.g. $-CH_2-$ ... $-CH_2-$), (5) R is a divalent cycloaliphatic radical, preferably a $C_4$ to $C_6$ cycloaliphatic hydrocarbon radical, (6) R is a divalent heteroaliphatic radical having oxygen or sulfur hetero chain atoms, preferably a divalent heteroaliphatic radical having one to two oxygen or sulfur hetero chain atoms and 2 to 10 carbon atoms, (7) R is a divalent heterocyclic radical having oxygen, sulfur or nitrogen hetero ring atoms, preferably a divalent heterocyclic radical having one to two oxygen, sulfur or nitrogen hetero ring atoms and from 5 to 6 atoms in the ring, (8) R is a divalent bicycle radical, preferably a divalent bridged carbocyclic six membered ring radical, (9) R' is a divalent polyoxyalkylene homopolymer radical, preferably a divalent polyoxyalkylene homopolymer radical having 2 to 4 carbon atoms in the oxyalkylene group and an average molecular weight of from about 72 to about 2000, (10) R' is a divalent polyoxyalkylene copolymer radical, preferably a divalent polyoxyalkylene copolymer radical having 2 to 4 carbon atoms in the oxyalkylene group and an average molecular weight of from about 86 to about 2000, (11) the salt of the polyamide according to formula (I) is the salt, preferably the alkali metal, ammonium or organic amine salt, of the terminal carboxylic acid group of said polyamide, (12) the water soluble or dispersible salt of the water soluble or dispersible polyamide according to formula (I) is the salt, preferably the alkali metal, ammonium or organic amine salt, of the terminal carboxylic acid group of said water soluble or dispersible polyamide, (13) the water soluble or dispersible salt of the water insoluble polyamide according to formula (I) is the salt, preferably the alkali metal, ammonium or organic amine salt, of the terminal carboxylic acid group of said water insoluble polyamide, (14) the salt of the polyamide according to formula (I) is the salt of the terminal amine group of said polyamide, (15) the water soluble or dispersible salt of the water soluble or dispersible polyamide according to formula (I) is the salt of the terminal amine group of said polyamide, (16) the water soluble or dispersible salt of the water insoluble polyamide according to formula (I) is the salt of the terminal amine group of said polyamide, (17) the salt of the polyamide according to formula (I) is the salt of both the terminal carboxylic acid group and the terminal amine group of said polyamide, (18) the water soluble or dispersible salt of the water soluble or dispersible polyamide according to formula (I) is the salt of both the terminal carboxylic acid group and the terminal amine group of said polyamide and (19) the water soluble or dispersible salt of the water insoluble polyamide according to formula (I) is the salt of both the terminal carboxylic acid group and the terminal amine group of said polyamide.

When R is a divalent aliphatic group it may be straight or branched chain, saturated or unsaturated, preferably it is a divalent straight or branched chain, saturated or monoethylenically unsaturated aliphatic hydrocarbon radical having 2 to 12 carbon atoms. Examples of the divalent aliphatic group include ethylene, 1,3-propylene, 1,2-propylene, 1,4-butylene, 1,3-butylene, vinylene, 1,6-hexylene, 1,8-octylene, 1,10-decylene and 2-dodecenylene. Where R is a divalent aromatic radical, preferably a phenylene or naphthylene radical, examples include 1,2-phenylene, 1,3-phenylene, 1,4-phenylene, 1,2-naphthylene, 1,4-napthylene, 1,5-naphthylene, 1,6-naphthylene, 1,8-naphthylene, 2,3-naphthylene, 2,6-naphthylene and 2,7-naphthylene. R may be a divalent alkyl aromatic radical, preferably a divalent alkyl aromatic radical having one to two $C_1$ to $C_4$ alkyl groups bonded to a phenylene group (e.g. 2,6-dimethyl-1,3-phenylene). As R there may be used a divalent arylaliphatic group, preferably a divalent arylaliphatic group having a phenyl group bonded to an alkylene group or two alkylene groups bonded to a benzene ring, examples of which include 2-phenyl-1,3-propylene, 2-phenyl-1, 1-ethylene, phenylene-1,2-dimethylene, phenylene-1,3-dimethylene, phenylene-1,4-dimethylene and phenylene-1,4-diethylene. Where R is a divalent cycloaliphatic radical it may have from zero to two double bonds in the ring, preferably a $C_4$ to $C_6$ carbocyclic divalent cycloaliphatic radical having zero to two double bonds in the ring, examples of which include 1,2-cyclobutylene, 1,3-cyclopentylene, 1,4-cyclohexylene, 1,3-cyclobutylene, 3-cyclobuten-1,2-ylene, 1,2-cyclohexylene,2,5-cyclohexadien-1,4-ylene and 3-cyclohexen-1,2-ylene. When R is a divalent heteroaliphatic radical having oxygen or sulfur hetero chain atoms, preferably a divalent heteroaliphatic radical having one or two oxygen or sulfur hetero chain atoms and two to six carbon atoms, examples include $—CH_2—O—CH_2—$, $—CH_2—S—CH_2—$, $—CH_2—CH_2—S—CH_2—CH_2—$, $—CH_2—CH_2—CH_2—S—CH_2—CH_2—CH_2—$ and $—CH_2—CH_2—CH_2—S—S—CH_2—CH_2—CH_2—$. R may be a divalent heterocyclic radical having one or two oxygen, sulfur or nitrogen hetero ring atoms, preferably a divalent heterocyclic radical having one oxygen, sulfur or nitrogen hetero ring atom and 5 to 6 atoms in the ring, examples of which include 2,3-thiophenediyl, 2,5-thiophenediyl, 2,3-pyrazolediyl, 2,4-furandiyl, 2,5-furandiyl, 3,4-furandiyl, 2,3-pyridinediyl, 2,5-pyridinediyl, 3,5-pyridinediyl, 2,4-pyrrolediyl, 2,3-pyrazinediyl and 2,6-pyrazinediyl. As R there may be used a divalent internally bridged carbocyclic radical examples of which include bicyclo (2,2,1) heptane-2,3-diyl and 5-norborene-2,3-diyl.

As examples of dicarboxylic acids usable in the preparation of the polyamide according to formula (I), in the practice of the polyamide and aqueous functional fluid composition of this invention, there includes, but not limited to, succinic, isosuccinic, chlorosuccinic, glutaric, pyrotartaric, adipic, chloroadipic, pimelic, suberic, chlorosuberic, azelaic, sebacic, brassylic, octadecanedioic, thapsic, eicosanedioic, maleic, fumaric, citriconic, mesaconic, aconitic, 1,2-benzene dicarboxylic, 1,3-benzene dicarboxylic, 1,4-benzene dicarboxylic, tetrachlorophthalic, tetrahydrophthalic, chlorendic, hexahydrophthalic, hexahydroisophthalic, hexahydroterephthalic, phenyl succinic, 2-phenyl pentanedioic, thiodipropionic acids, carboxylic acid products of the dimerization of $C_8$ to $C_{26}$ monomeric unsaturated fatty acids such as described in U.S. Pat. No. 2,482,760 (C. C. Goebel—Sept. 27, 1949), U.S. Pat. No. 2,482,761 (C. C. Goebel—Sept. 27, 1949), U.S. Pat. No. 2,731,481 (S. A. Harrison—Jan. 17, 1956), U.S. Pat. No. 2,793,219 (F. O. Barrett et al.—May 21, 1957), U.S. Pat. No. 2,964,545 (S. A. Harrison—Dec. 13, 1960), U.S. Pat. No. 2,978,468 (B. L. Hampton—Apr. 4, 1961), U.S. Pat. No. 3,157,681 (E. M. Fisher Nov. 17, 1964) and U.S. Pat. No. 3,256,304 (C. M. Fisher et al.—June 1966), the entire disclosures of which are incorporated herein by reference, the carboxylic acid products of the Diels-Alder type reaction of an unsaturated fatty acid with $\alpha,\beta$-ethylenically unsaturated carboxy acid (e.g. acrylic, methacrylic, maleic or fumaric acids) such as are taught in U.S. Pat. No. 2,444,328 (C. M. Blair, Jr.—June 29, 1948) the disclosure of which is incorporated herein by reference, and the Diels-Alder adduct of a three to four carbon atom $\alpha,\beta$-ethylenically unsaturated alkyl monocarboxylic or dicarboxylic acid (e.g. acrylic and fumaric acids respectively) and pimeric or abietic acids. Examples of the dimerized $C_8$ to $C_{26}$ monomeric unsaturated fatty acids include but are not limited to such products as Empol ® 1014 Dimer Acid and Empol ® 1016 Dimer Acid each available from Emery Industries, Inc. As examples of the carboxylic acid product of a Diels-Alder type reaction there may be cited the commercially available Westvaco ® Diacid 1525 and Westvaco ® Diacid 1550, both being available from the Westvaco Corporation. Additional examples of dicarboxylic acids usable in the preparation of the polyamide according to formula (I) for the practice of the polyamide and aqueous functional fluid composition of this invention include thiodiacetic, 4,4' dithiodibutyric, carboxyphenoxyacetic, 2,3-thiophene dicarboxylic, 2,4-thiophene dicarboxylic, 2,5-thiophene dicarboxylic, 2,3-pyrazoledicarboxylic, 2-imidazoline dicarboxylic, benzyl malonic, phenyl diacetic, phenyl dipropionic, 2,3-furandicarboxylic, 2,4-furandicarboxylic, 2,5-furandicarboxylic, 3,4-furandicarboxylic, 2,4-pyrroledicarboxylic, 2,3-pyridinedicarboxylic, 2,4-pyridinedicarboxylic, 2,5-pyridinedicarboxylic, 2,6-pyridinecarboxylic, 3,4-pyridinedicarboxylic, 3,5-pyridinedicarboxylic, 1,4-piperazinedicarboxylic, 2,3-pyrazinedicarboxylic, 2,5-pyrazinedicarboxylic, 2,6-pyrazinedicarboxylic, bicyclo (2,2,10 heptene-1,3-dicarboxylic and cis-5-norbornene-endo-2,3-dicarboxylic acids.

In place of the dicarboxylic acid there may be used the corresponding anhydride or acid halide, where the acid admits of the formation of the anhydride and acid halide, e.g. acid chloride. Where there is used the corresponding acid halide of the dicarboxylic acid to prepare the polyamide according to formula (I) it is, of course, necessary to convert the terminal acid halide groups of the polyamide product, resulting from the reaction of the acid halide with the amine group terminated polyoxyalkylene homopolymer or copolymer diamine, to the corresponding carboxylic acid group. Such conversion of the terminal acid halide groups to carboxylic acid groups may be accomplished by methods well known in the art.

In accordance with formula (I) R′ is a divalent polyoxyalkylene homopolymer or copolymer radical. Such divalent radicals are derived from polyoxyalkylene homopolymer and copolymer diamines by removal of both terminal amine groups from said homopolymer and copolymer diamines. As examples of divalent polyoxyalkylene homopolymer and copolymer radicals there include said divalent radicals resulting from the removal of both terminal amine groups from polyoxyalkylene homopolymer and copolymer diamines such as for example polyoxyethylene diamine, polyoxypropylene diamine, polyoxybutylene diamine, polyoxypropylene/polyoxyethylene block and random copolymer diamine, polyoxypropylene/polyoxyethylene/polyoxypropylene block copolymer diamine, polyoxybutylene/polyoxyethylene/polyoxybutylene block copolymer diamine, polyoxybutylene/polyoxypropylene/polyoxybutylene block copolymer diamine, polyoxypropylene/polyoxybutylene/polyoxypropylene block copolymer diamine, polyoxyethylene/polyoxybutylene block or random copolymer diamine and polyoxypropylene/polyoxybutylene block or random copolymer diamine. The polyoxybutylene may contain 1,2-oxybutylene, 2,3-oxybutylene or 1,4-oxybutylene units. The length of the polyoxyalkylene blocks, i.e. the number of oxyalkylene groups in the block, may vary widely. Where the divalent polyoxyalkylene copolymer radicals are block terpolymer radicals (e.g. polyoxypropylene/polyoxyethylene/polyoxypropylene block terpolymer prepared by oxpropylating both ends of a polyoxyethylene chain) the terminal polyoxyalkylene blocks may be polyoxyethylene, polyoxypropylene or polyoxybutylene blocks containing as few as 2 oxyethylene, oxypropylene or oxybutylene units respectively or there may be present in the terminal block from 3 and up to 20 oxyalkylene units. Although the molecular weight of the polyoxyalkylene homopolymer or copolymer diamine that (1) is the source of the R′ divalent radical of the polyamide according to formula (I) and (2) may be used to prepare the polyamide according to formula (I) may vary over a wide range it is preferred to use polyoxyalkylene homopolymer and copolymer diamines having an average molecular weight in the range of from about 72 to about 4000, more preferably in the range of from about 72 to 2000. Preferably the polyamide according to formula (I) has the terminal amine group or salt thereof bonded to a terminal secondary carbon atom (i.e. carbon atom having one hydrogen bonded thereto) of the divalent R′ radical.

As organic amines usable in the practice of this invention for forming the amine salt of the terminal carboxylic acid group of the polyamide according to formula (I) there may be used an alkyl primary amine, alkyl secondary amine, alkyl tertiary amine and preferably a monoalkanol amine, dialkanol amine or trialkanol amine. Alkyl primary, secondary and tertiary amine salts of the carboxylic acid group having from 2 to 8 carbon atoms in the alkyl group of the amine, may be used in the practice of this invention. It is, however, preferred to use the monoalkanol amine, dialkanol amine and trialkanol amine salts of the carboxylic acid group, wherein the alkanol group contains from 2 to 8 carbon atoms and may be branched or unbranched in the practice of this invention. The use of the monoalkanol amine and trialkanol amine salts of the carboxylic acid group, wherein the alkanol group has from 2 to 8 carbon atoms, is still more preferred in the practice of this invention. Organic amines which may also be used to form the amine salts of the terminal carboxylic acid group also include $C_2$ to $C_6$ alkylene diamines, poly($C_2$ to $C_4$ oxyalkylene) diamines having a molecular weight of from about 200 to about 900, N-$C_1$ to $C_8$ alkyl $C_2$ to $C_6$ alkylene diamine, N,N′-di $C_1$ to $C_8$ alkyl $C_2$ to $C_6$ alkylene diamine, N,N,N′-tri $C_1$ to $C_8$ alkyl $C_2$ to $C_6$ alkylene diamine, N,N,N′,N′-tetra $C_1$ to $C_8$ alkyl $C_2$ to $C_6$ alkylene diamine, N-alkanol $C_2$ to $C_6$ alkylene diamine, N,N′-dialkanol $C_2$ to $C_6$ alkylene diamine, N,N,N′,N′-tetraalkanol $C_2$ to $C_6$ alkylene diamine and $CH_3CH_2O(CH_2CH_2O)_nCH_2CH_2CH_2NH_2$ wherein n is 1 or 2. Alkyl alkanol amines having from 2 to 8 carbon atoms in the alkyl and alkanol groups may also be used as the organic amine in the practice of this invention.

Examples of alkyl amines, which may be used to form the alkyl amine salts of the terminal carboxylic acid group of the polyamide according to formula (I), in the practice of this invention, include but are not limited to ethyl amine, butyl amine, propyl amine, isopropyl amine, secondary butyl amine, tertiary butyl amine, hexyl amine, isohexyl amine, n-octyl amine, 2-ethyl hexyl amine, diethyl amine, dipropyl amine, diisopropyl amine, dibutyl amine, ditertiary butyl amine, dihexyl amine, di n-octyl amine, di 2-ethyl hexyl amine, triethyl amine, tripropyl amine, triisopropyl amine, tributyl amine, tri-secondary butyl amine, triisopropyl amine, trihexyl amine, tri n-octyl amine and tri-2-ethyl hexyl amine. As examples of alkanol amines, which may be used to make the alkanol amine salts of the terminal carboxyl group in the practice of this invention, there include, but not limited to, monoethanol amine, monobutanol amine, monopropanol amine, monoisopropanol amine, monoisobutanol amine, monohexanol amine, monooctanol amine, diethanol amine, dipropanol amine, diisopropanol amine, dibutanol amine, dihexanol amine, diisohexanol amine, dioctanol amine, triethanol amine, tripropanol amine, triisopropanol amine, tributanol amine, triisobutanol amine, trihexanol amine, triisohexanol amine, trioctanol amine and triisooctanol amine. There may also be used in the practice of this invention amines such as methoxypropylamine, dimethyl aminopropyl amine, 1,3-propylene diamine, ethylene diamine, 3(2-ethoxyethoxy)propyl amine, N,N,N′,N′-tetramethyl-1,3-butane diamine, monoethanol ethylene diamine, N,N′-diethanol ethylene diamine, N,N,N′N′-tetra hydroxymethyl ethylene diamine, N,N-diethyl ethanol amine and N-ethyl diethanol amine for preparing the organic amine salt of the terminal carboxylic acid group of the polyamide according to formula (I).

The organic amine salt of the terminal carboxylic acid group of the polyamide according to formula (I) may be prepared by methods well known in the art, such as, for example, by adding the organic amine to the polyamide according to formula (I) in the presence of an aqueous medium or conversely adding the polyamide according to formula (I) to the organic amine in the presence of an aqueous medium. In alternative methods the aqueous medium may be omitted or the aqueous medium may be replaced by an inert organic solvent medium.

Alkali metal salts of the terminal carboxylic acid group of the polyamide according to formula (I), in the practice of the polyamide and aqueous functional fluid composition of this invention include for example the lithium, sodium, potassium, rubidium and cesium salts. The lithium, sodium and potassium salts are however preferred among the alkali metal salts of the terminal carboxylic acid group of the polyamide according to formula (I). Formation of the alkali metal salts of the terminal carboxylic acid group of the polyamide according to formula (I) may be accomplished by methods well known in the art such as, for example, by adding the polyamide according to formula (I) to the hydroxide of the alkali metal in the presence of an aqueous medium.

The salts of the terminal amine group of the polyamide according to formula (I), i.e. the salt of the polyamide according to formula (I) formed by making the salt of the terminal amine group of said polyamide, in the practice of the polyamide and aqueous functional fluid composition of this invention may be the (a) quaternary ammonium salt of the terminal amine, formed by displacement of both of the amine hydrogens by organic (e.g. alkyl) groups, (b) inorganic acid salts (e.g. hydrogen chloride salt) (c) organic acid salts or (d) alkyl halide (e.g. methyl chloride) salt of the terminal amine group. Water soluble or dispersible intermolecular salts formed by the interaction of the terminal amine group of one polyamide molecule, according to this invention, with the terminal carboxylic acid group of another polyamide molecule, according to this invention, are also contemplated in the practice of the polyamide and aqueous functional fluid composition of this invention.

In the preparation of the polyamide according to formula (I), for the practice of this invention, there may be used a dicarboxylic acid or its corresponding anhydride or its corresponding acid halide.

Methods well known in the art may be employed to prepare the polyamide according to formula (I) in the practice of the polyamide and aqueous functional fluid composition of this invention. For example, an appropriate dicarboxylic acid may be reacted with a suitable polyoxyalkylene diamine under polymerizing conditions at 1:1 mole ratio in an inert organic medium with the continuous removal of the water formed during the reaction. The resulting polymer may then be isolated from the inert organic reaction medium by a method such as filtration or by evaporation of the organic medium. The reaction may be carried out (a) at room or elevated temperatures, (b) at atmospheric pressure or at pressures above or below atmospheric pressure, (c) with or without the use of a catalyst, (d) with or without the use of an inert atmosphere (e.g. nitrogen) and (e) in the absence of an inert reaction medium.

Conventional methods and apparatus well known in the art may be used to prepare the aqueous functional fluid composition of this invention. As one example of such methods the water soluble or dispersible polyamide according to formula (I) may be added to water. Another method would be to add a water soluble or dispersible salt of a water soluble or dispersible polyamide according to formula (I) to water. In a further method the water soluble or dispersible salt of the water insoluble polyamide according to formula (I) would be added to water. In a still further example of a method for preparing the aqueous functional fluid composition, water could be added to the water soluble or dispersible polyamide according to formula (I), the water soluble or dispersible salt of a water soluble or dispersible polyamide according to formula (I) or the water soluble or dispersible salt of a water insoluble polyamide according to formula (I). In an even further example of a method for preparing an aqueous functional fluid composition of this invention a salt forming compound (e.g. organic amine) may be added to water and then the water soluble or dispersible polyamide according to formula (I) added to the resulting aqueous solution. The water soluble or dispersible polyamide according to formula (I) may be added to water followed by the addition thereto of a salt forming compound (e.g. organic amine) in the preparation of the aqueous functional fluid composition of this invention.

The concentration of the (a) water soluble or dispersible polyamide according to formula (I), (b) water soluble or dispersible salt of a water soluble or dispersible polyamide according to formula (I) or (c) water soluble or dispersible salt of a water insoluble polyamide according to formula (I) in the aqueous functional fluid composition of this invention may vary over a wide range, e.g. 0.01 to 99%, preferably 0.01 to 20%, more preferably 0.03 to 10%, by weight based on the total weight of the aqueous functional fluid composition. There may be present in the aqueous functional fluid composition of this invention from about 1% to about 99.99% by weight of water based on the total weight of said composition.

Various additives well known in the art, including for example corrosion inhibitors, anti-foam agents, bacteriocides, fungicides, surfactants, extreme pressure agents, antioxidants and adjunct water soluble or dispersible lubricants, may be added to the aqueous functional fluid composition of this invention in conventional amounts.

In the preferred practice of the aqueous functional fluid composition of this invention there is provided a composition comprising water and as a lubricant a water soluble or dispersible alkanol amine salt of a water soluble or dispersible polyamide according to formula (I) wherein R is a divalent radical residue derived by the removal of the carboxylic acid groups from a dimerized $C_{18}$ unsaturated fatty acid and R' is a divalent polyoxyalkylene chain having a terminal secondary carbon atom bonded to the terminal amine group of the polyamide.

This invention is further described with respect to more specific embodiments thereof in the following non-limiting examples. In the examples below all amounts and percentages are by weight and all temperatures are in degrees Centigrade unless otherwise specified.

EXAMPLES 1 to 43

These examples teach various polyamides according to this invention. The polyamides are identified in the table below by means of the dicarboxylic acid and diamine reactants used in their preparation and by their molecular weight. The polyamides were prepared by conventional methods, two examples of which are as follows.

Method I 34.43 grams (0.2 moles) of cyclohexane-1,4-dicarboxylic acid, 125.46 grams (0.2 moles) of Jeffamine ® ED-600 (a diamine, having an average molecular weight of about 600, that is a primary amine terminated propylene oxide capped polyoxyethylene available from the Texaco Chemical Company) and 150 milliliters of xylene were placed in a reaction flask equipped with an agitator and a trap. The reaction mixture was stirred and heated to reflux. Refluxing and stirring were maintained for 73 hours resulting (1) the collection of 6.7 milliliters of water (100% of theoretical) and (2) a viscous, turbid, amber reaction mixture. The xylene was removed from the reaction mixture on a rotary evaporator to produce 153.9 grams of a glassy amber solid having an acid value of 14.2 and neutralization value of 12.8.

Method II 93.4 grams (0.16 moles) of Dimer Acid 3680 (see (a) below) and 154.7 grams (0.16 moles) of Jeffamine ® ED 900 (see (k) below) were placed in a reaction flask. The contents of the flask were heated to 230° to 255° C. and stirred for 37 hours while applying a vacuum of 5 to 7 mm, with a slight nitrogen bleed, to remove the water produced by the reaction. The water was collected in a dry ice trap. At the end of the reaction period the contents of the flask were cooled to room temperature under a nitrogen blanket. A product was obtained which exhibited an acid value of 1.3 and a neutralization value of 0.5.

The dicarboxylic acid and diamine reactants listed in the table below are described as follows.

(a) Dimer Acid 3680-Hystrene ® 3680-80% Dimer Acid, acid value 190–197, saponification value 191–199, neutral equivalent 285–295, monomer acid 1% max., viscosity at 25° C. (cSt) 8,000, unsaponifiable 1.0, monomer Tr., Dimer 83, Trimer 17, available from the Humko Sheffield Chemical Inc. Hystrene is a registered trademark of Humko Sheffield Chemical Inc.

(b) Dimer Acid 3675 CS-Hystrene ® 3675CS-75% Dimer Acid, 3% monomer, acid value 194–201, saponification value 196–203, neutral equivalent 279–289, monomer acid 3–4 max, viscosity at 25° C. (cSt) 12000, unsaponifiable 1.0, Monomer 3, Dimer 85, Trimer 12 available from the Humko Sheffield Chemical Inc. Hystrene is a registered trademark of Humko Sheffield Chemical Inc.

(c) Empol ® 1014 Dimer acid: A polymerized fatty acid having a typical composition of 95% dimer acid ($C_{36}$ dibasic acid) approx. mol. wt. 565, 4% trimer acid ($C_{54}$ tribasic acid) approx. mol. wt. 845 and 1% monobasic acid ($C_{18}$ fatty acid) approx. mol. wt. 282 available from Emery industries, Inc.

(d) Westvaco ® Diacid 1525: The Diels-Alder reaction product of tall oil and acrylic acid available from Westvaco Corp.

(e) Westvaco ® Diacid 1550: The Diels-Alder reaction product of tall oil and acrylic acid, said product refined to contain about 10% monoacids, available from the Westvaco Corp.

(f) DBD-DuPont ® DBD-dibasic acid mixture of high molecular weight dibasic acids, primarily $C_{12}$ and $C_{11}$, typical composition dodecanedioic acid 34% by wt., undecanedioic acid 50% by wt., sebacic acid 7% by wt., other dibasic acids 8.5% by wt., monobasic acids 1% by wt., nitro dibasic acids 7.2% by wt., other organic nitro compounds 0.9% by wt., inorganic nitrogen compounds 0.9% by wt., water 0.5% by wt., total nitrogen 0.9% by wt., off white flaked solid, softening point 85°–95° C. and average molecular weight 215 available from E. I. DuPont de Nemours & Company Inc.

(g) Jeffamine ® D230 is a primary amine terminated polyoxypropylene diamine having an average molecular weight of about 230 and available from the Texaco Chemical Company.

(h) Jeffamine ® D400 is a primary amine terminated polyoxypropylene diamine having an average molecular weight of about 400 and available from the Texaco Chemical Company.

(i) Jeffamine ® D2000 is a primary amine terminated polyoxypropylene diamine having an average molecular weight of about 2000 and available from the Texaco Chemical Company.

(j) Jeffamine ® ED 600 is a diamine having an average molecular weight of about 600 available from the Texaco Chemical Company and being a primary amine terminated propylene oxide capped polyoxyethylene.

(k) Jeffamine ® ED900 is a diamine having an average molecular weight of about 900 available from the Texaco Chemical Company and being a primary amine terminated propylene oxide capped polyoxyethylene.

(l) Jeffamine ® ED 2001 is a diamine having an average molecular weight of about 2000 available from the Texaco Chemical Company and being a primary amine terminated propylene oxide capped polyoxyethylene.

(m) Dow ® XA 1332 is a diamine obtained from the Dow Chemical Company and is a primary amine terminated propylene oxide capped 400 molecular weight polyoxyethylene.

(n) Dow ® XA 1333 is a diamine obtained from the Dow Chemical Company and is a primary amine terminated propylene oxide capped 600 molecular weight polyoxyethylene.

Jeffamine is a registered trademark of the Texaco Chemical Company and Dow is a registered trademark of the Dow Chemical Company.

| Example No. | Dicarboxylic Acid | Diamine | Average Molecular weight of polyamide |
|---|---|---|---|
| 1 | Dimer Acid 3680 | Jeffamine ED-900 | 1,600 |
| 2 | Dimer Acid 3680 | Jeffamine ED-900 | 2,700 |
| 3 | Dimer Acid 3680 | Jeffamine ED-900 | 4,000 |
| 4 | Dimer Acid 3680 | Jeffamine ED-900 | 5,400 |
| 5 | Dimer Acid 3680 | Jeffamine ED-900 | 18,000 |
| 6 | Dimer Acid 3680 | Jeffamine D-230 | 2,600 |
| 7 | Dimer Acid 3680 | Jeffamine D-400 | 2,800 |
| 8 | Dimer Acid 3680 | Jeffamine D-2000 | 12,000 |
| 9 | Dimer Acid 3680 | Jeffamine ED-600 | 3,900 |
| 10 | Dimer Acid 3680 | Jeffamine ED-2001 | 9,300 |

-continued

| Example No. | Dicarboxylic Acid | Diamine | Average Molecular weight of polyamide |
|---|---|---|---|
| 11 | Dimer Acid 1014 | Jeffamine ED-900 | 8,200 |
| 12 | Dimer Acid 1014 | Jeffamine ED-2001 | 19,000 |
| 13 | Dimer Acid 1014 | Jeffamine D-400 | 9,000 |
| 14 | Dimer Acid 1014 | Dow XA 1332 | 6,500 |
| 15 | Dimer Acid 3675 CS | Dow XA 1333 | 10,400 |
| 16 | Diacid 1550 | Jeffamine ED-900 | 3,600 |
| 17 | Diacid 1550 | Jeffamine ED-2001 | 5,700 |
| 18 | Diacid 1550 | Dow XA 1332 | 4,400 |
| 19 | Diacid 1550 | Dow XA 1333 | 3,900 |
| 20 | Diacid 1525 | Jeffamine ED-900 | 4,600 |
| 21 | Diacid 1525 | Jeffamine ED-2001 | 5,900 |
| 22 | Diacid 1525 | Jeffamine ED-600 | 3,700 |
| 23 | Diacid 1525 | Jeffamine D-400 | 2,800 |
| 24 | Diacid 1525 | Dow XA 1333 | 8,000 |
| 25 | Dodecanedioic acid | Jeffamine ED-900 | 5,700 |
| 26 | DBD | Jeffamine ED-600 | 2,600 |
| 27 | Adipic Acid | Jeffamine ED-600 | 4,300 |
| 28 | Azelaic Acid | Jeffamine ED-600 | 7,100 |
| 29 | Azelaic Acid | Jeffamine ED-900 | 4,600 |
| 30 | Azelaic Acid | Dow XA 1332 | 7,300 |
| 31 | p-phenylene diacetic Acid | Jeffamine ED-600 | 3,600 |
| 32 | 2,5-pyridinedicarboxylic Acid | Jeffamine ED-2001 | 3,100 |
| 33 | Terephthalic Acid | Jeffamine ED-900 | 5,000 |
| 34 | Cyclohexane-1,4-dicarboxylic Acid | Jeffamine ED-600 | 4,200 |
| 35 | Hexachloronorbornene dicarboxylic Acid | Jeffamine ED-600 | 14,000 |
| 36 | Maleic Anhydride | Jeffamine D-400 | 1,400 |
| 37 | Fumaric Acid | Jeffamine D-400 | 1,400 |
| 38 | Fumaric Acid | Jeffamine ED-900 | 3,200 |
| 39 | Diglycolic Acid | Jeffamine D-2000 | 5,100 |
| 40 | Terephthalic Acid | Jeffamine ED-600 | 2,100 |
| 41 | Terephthalic Acid | Jeffamine ED-400 | 2,800 |
| 42 | Mesaconic Acid | Jeffamine ED-900 | 8,300 |

EXAMPLES 43 to 113

These examples, as shown in the table below, demonstrate aqueous functional fluid compositions in accordance with this invention.

| Example No. | Polyamide of Ex. No. | Wt. of Polyamide (gm) | Wt. (gm) of NaOH | KOH | $NH_4OH$ | TEA [1] | MIPA [2] | DEA [3] | Wt. of Water (gm) |
|---|---|---|---|---|---|---|---|---|---|
| 43 | 1 | 15 | | | | 15 | | | 470 |
| 44 | 1 | 15 | | | | | | 10.6 | 474.4 |
| 45 | 2 | 15 | | | | 15 | | | 470 |
| 46 | 2 | 15 | | | | | 7.5 | | 477.5 |
| 47 | 3 | 15 | | | | | 15 | | 470 |
| 48 | 3 | 15 | | 5.6 | | | | | 479.4 |
| 49 | 4 | 15 | | | | 15 | | | 470 |
| 50 | 4 | 15 | | 5.6 | | | | | 479.4 |
| 51 | 5 | 15 | | | | 15 | | | 470 |
| 52 | 6 | 15 | | | | 15 | | | 470 |
| 53 | 6 | 15 | 4.0 | | | | | | 481 |
| 54 | 7 | 15 | | | | 15 | | | 470 |
| 55 | 7 | 15 | | 5.6 | | | | | 479.4 |
| 56 | 8 | 15 | | | | 15 | | | 470 |
| 57 | 8 | 15 | | | | | 7.5 | | 477.5 |
| 58 | 9 | 0.6 | | | | 0.6 | | | 498.8 |
| 59 | 9 | 1.5 | | | | 1.5 | | | 497 |
| 60 | 9 | 6 | | | | 6 | | | 488 |
| 61 | 9 | 15 | | | | 15 | | | 470 |
| 62 | 9 | 60 | | | | 60 | | | 380 |
| 63 | 10 | 15 | | | | 15 | | | 470 |
| 64 | 10 | 15 | | | 3.5 | | | | 481.5 |
| 65 | 11 | 15 | | | | 15 | | | 470 |
| 66 | 12 | 15 | | | | 15 | | | 470 |
| 67 | 13 | 15 | | | | 15 | | | 470 |
| 68 | 14 | 15 | | | | 15 | | | 470 |
| 69 | 15 | 15 | | | | 15 | | | 470 |
| 70 | 16 | 15 | | | | 15 | | | 470 |
| 71 | 16 | 15 | | 5.6 | | | | | 479.4 |
| 72 | 17 | 15 | | | | 15 | | | 470 |
| 73 | 17 | 15 | | | | | | | 485 |
| 74 | 17 | 15 | 4.0 | | | | | | 481 |
| 75 | 18 | 15 | | | | 15 | | | 470 |
| 76 | 19 | 15 | | | | 15 | | | 470 |
| 77 | 20 | 15 | | | | 15 | | | 470 |
| 78 | 20 | 15 | | | | | | | 485 |
| 79 | 21 | 15 | | | | 15 | | | 470 |
| 80 | 21 | 15 | | | 3.5 | | | | 481.5 |
| 81 | 22 | 15 | | | | 15 | | | 470 |
| 82 | 22 | 15 | 4.0 | | | | | | 481 |
| 83 | 23 | 15 | | | | 15 | | | 470 |
| 84 | 23 | 15 | | | | | 7.5 | | 477.5 |
| 85 | 24 | 15 | | | | 15 | | | 470 |
| 86 | 25 | 15 | | | | 15 | | | 470 |
| 87 | 25 | 15 | | 5.6 | | | | | 479.4 |
| 88 | 26 | 15 | | | | 15 | | | 470 |
| 89 | 26 | 15 | | | | | 7.5 | | 477.5 |
| 90 | 26 | 15 | | | | | | 10.6 | 474.4 |
| 91 | 27 | 15 | | | | 15 | | | 470 |

-continued

| Example No. | Polyamide of Ex. No. | Wt. of Polyamide (gm) | Wt. (gm) of NaOH | KOH | $NH_4OH$ | TEA [1] | MIPA [2] | DEA [3] | Wt. of Water (gm) |
|---|---|---|---|---|---|---|---|---|---|
| 92 | 27 | 15 | | | | | | | 485 |
| 93 | 27 | 15 | | 5.6 | | | | | 479.4 |
| 94 | 28 | 15 | | | | 15 | | | 470 |
| 95 | 28 | 15 | | | | | | 10.6 | 474.4 |
| 96 | 29 | 15 | | | | 15 | | | 470 |
| 97 | 29 | 15 | | | 3.5 | | | | 481.5 |
| 98 | 30 | 15 | | | | 15 | | | 470 |
| 99 | 31 | 15 | | | | 15 | | | 470 |
| 100 | 31 | 15 | | | | | | 10.6 | 474.4 |
| 101 | 32 | 15 | | | | 15 | | | 470 |
| 102 | 32 | 15 | 4.0 | | | | | | 481 |
| 103 | 33 | 15 | | | | 15 | | | 470 |
| 104 | 33 | 15 | 4.0 | | | | | | 481 |
| 105 | 34 | 15 | | | | 15 | | | 470 |
| 106 | 35 | 15 | | | | 15 | | | 470 |
| 107 | 36 | 15 | | | | 15 | | | 470 |
| 108 | 37 | 15 | | | | 15 | | | 470 |
| 109 | 38 | 15 | | | | 15 | | | 470 |
| 110 | 39 | 15 | | | | 15 | | | 470 |
| 111 | 40 | 15 | | | | 15 | | | 470 |
| 112 | 41 | 15 | | | | 15 | | | 470 |
| 113 | 42 | 15 | | | | 15 | | | 470 |

[1] triethanol amine
[2] monoisopropanol amine
[3] diethanol amine

EXAMPLES 114 to 184

500 grams of each of the formulations of Examples 43 to 113 were diluted to 3000 grams with water and the resulting diluted formulations then evaluated for lubricity in accordance with the following test procedure.

Test Procedure

A wedge-shaped high-speed tool is forced against the end of a rotating (88 surface feet per minute) SAE 1020 steel tube of ¼ inch wall thickness. The feed force of the tool is sufficient to cut a V-groove in the tubing wall, and the chips flow out of the cutting area in two pieces (one piece from each face of the wedge-shaped tool). The forces on the tool as a result of workpiece rotation and of tool feed are measured by a tool post dynamometer connected to a Sanborn recorder. Any welding of chips to tool build-up is reflected in the interruption of chip-flow (visual) and in increased resistance to workpiece rotation. The cutting test is performed with the tool-chip interface flooded throughout the operation with circulating test fluid. Tool and workpiece are in constant dynamic contact during this time, and the test is not begun until full contact is achieved all along each cutting edge. The duration of the test is three minutes.

The results obtained in accordance with the above test procedure are given in the following table.

| Example No. | Formulation of Example No. | Force (lbs.) |
|---|---|---|
| 114 | 43 | 454 |
| 115 | 44 | 458 |
| 116 | 45 | 368 |
| 117 | 46 | 411 |
| 118 | 47 | 358 |
| 119 | 48 | 490 |
| 120 | 49 | 308 |
| 121 | 50 | 472 |
| 122 | 51 | 318 |
| 123 | 52 | 408 |
| 124 | 53 | 498 |
| 125 | 54 | 400 |
| 126 | 55 | 503 |
| 127 | 56 | 415 |

-continued

| Example No. | Formulation of Example No. | Force (lbs.) |
|---|---|---|
| 128 | 57 | 389 |
| 129 | 58 | 480 |
| 130 | 59 | 426 |
| 131 | 60 | 306 |
| 132 | 61 | 307 |
| 133 | 62 | 319 |
| 134 | 63 | 394 |
| 135 | 64 | 457 |
| 136 | 65 | 316 |
| 137 | 66 | 390 |
| 138 | 67 | 373 |
| 139 | 68 | 308 |
| 140 | 69 | 307 |
| 141 | 70 | 406 |
| 142 | 71 | 481 |
| 143 | 72 | 433 |
| 144 | 73 | 392 |
| 145 | 74 | 523 |
| 146 | 75 | 385 |
| 147 | 76 | 406 |
| 148 | 77 | 431 |
| 149 | 78 | 419 |
| 150 | 79 | 464 |
| 151 | 80 | 468 |
| 152 | 81 | 458 |
| 153 | 82 | 487 |
| 154 | 83 | 471 |
| 155 | 84 | 487 |
| 156 | 85 | 460 |
| 157 | 86 | 394 |
| 158 | 87 | 459 |
| 159 | 88 | 381 |
| 160 | 89 | 437 |
| 161 | 90 | 334 |
| 162 | 91 | 487 |
| 163 | 92 | 501 |
| 164 | 93 | 488 |
| 165 | 94 | 473 |
| 166 | 95 | 487 |
| 167 | 96 | 459 |
| 168 | 97 | 498 |
| 169 | 98 | 445 |
| 170 | 99 | 415 |
| 171 | 100 | 483 |
| 172 | 101 | 503 |
| 173 | 102 | 524 |
| 174 | 103 | 446 |

-continued

| Example No. | Formulation of Example No. | Force (lbs.) |
|---|---|---|
| 175 | 104 | 491 |
| 176 | 105 | 473 |
| 177 | 106 | 443 |
| 178 | 107 | 448 |
| 179 | 108 | 419 |
| 180 | 109 | 480 |
| 181 | 110 | 388 |
| 182 | 111 | 483 |
| 183 | 112 | 385 |
| 184 | 113 | 471 |

What is claimed is:

1. A *salt of a* polyamide derivative of a polyoxalkylene diamine wherein said polyamide has (a) a single terminal carboxylic acid group and a single terminal amine group in the same molecule, and (b) a degree of polymerization of from 2 to 10 [or the] which salt of the polyamide [which] is the salt of (c) the terminal carboxylic acid group, (d) the terminal amine group, or (e) both the terminal carboxylic acid and terminal amine groups, wherein the polyamide has the following formula

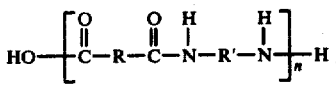

where

R is a divalent aliphatic, aromatic, arylaliphatic, alkylaromatic, cycloaliphatic, heteroaliphatic having oxygen or sulfur heterochain atoms, heterocyclic having one to two oxygen, sulfur or nitrogen hetero ring atoms and from 5 to 6 ring atoms or bicyclic radical or the halogenated derivatives of said divalent radical, R' is a divalent polyoxyaliylene homopolymer or copolymer radical and n is 2 to 10, said [polyamide and its salts] *salt* having an average molecular weight not greater than about 50,000.

2. A [polyamide] *salt* according to claim 1 [the salt of the polyamide] which is the salt of the terminal carboxylic acid group.

3. A [polyamide or] salt [thereof] according to claim 1 wherein R is a divalent aliphatic hydrocarbon radical having from 2 to 12 carbon atoms.

4. A [polyamide or] salt [thereof] according to claim 1 wherein R is a phenylene or naphthylene radical.

5. A [polyamide or] salt [thereof] according to claim 1 wherein R is a divalent $C_4$ to $C_6$ cycloaliphatic radical.

6. A [polyamide or] salt [thereof] according to claim 1 wherein R is a divalent heteroaliphatic radical having one to two oxygen or sulfur heterochain atoms and from 2 to 6 carbon atoms.

7. A [polyamide or] salt [thereof] according to claim 1 wherein R is a divalent heterocyclic radical having one to two oxygen, sulfur or nitrogen hetero ring atoms and from 5 to 6 ring atoms.

8. A [polyamide or] salt [thereof] according to claim 1 wherein R is a divalent radical residue obtained by the removal of both carboxylic acid groups from a dimerized ethylenically unsaturated $C_8$ to $C_{26}$ fatty acid.

9. A [polyamide or] salt [thereof] according to claim 3,4, 5,6,7 or 8 wherein R' is a divalent polyoxyalkylene homopolymer radical having an average molecular weight in the range from 72 to 4000.

10. A [polyamide or] salt [thereof] according to claim 3,4, 5,6,7 or 8 wherein R is a divalent polyoxyalkylene copolymer radical having an average molecular weight in the range from 86 to 4000.

11. The alkali metal, ammonium or organic amine salt of the carboxylic acid group of the polyamide according to claim 8.

12. The organic amine salt according to claim 11 wherein the organic amine is an alkanol amine.

13. The salt according to claim 12 wherein the alkanolamine is a mono, di or tri ($C_2$ to $C_4$ alkanol) amine.

14. The salt formed by the terminal amine group of the polyamide according to claim 1.

15. An aqueous functional fluid composition comprising (a) water, and (b) a lubricant compound selected from the group consisting of [a water soluble or dispersible polyamide derivative of a polyoxyalkylene diamine wherein the polyamide has a single terminal carboxylic acid group and a single terminal amine group in the same molecule and a degree of polymerization from 2 to 10,] a water soluble or dispersible salt of a water soluble or dispersible polyamide derivative of a polyoxyalkylene diamine wherein the polyamide has a single terminal carboxylic acid group and a single terminal amine group in the same molecule and a degree of polymerization of from 2 to 10 or a water soluble or dispersible salt of a water insoluble polyamide derivative of a polyoxyalkylene diamine wherein the polyamide has a single terminal carboxylic acid group and a single terminal amine group in the same molecule and a degree of polymerization of from 2 to 10, wherein the polyamide derivative has the formula

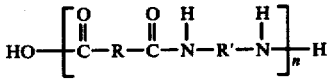

where

R is a divalent aliphatic, aromatic, arylaliphatic, alkylaromatic, cycloaliphatic, heteroaliphatic having oxygen or sulfur heterochain atoms, heterocyclic having one to two oxygen, sulfur or nitrogen hetero ring atoms and 5 to 6 ring atoms or bicyclic radical or the halogenated derivative of said radical, R' is a divalent polyoxyalkylene homopolymer or copolymer radical and n is 2 to 10, said [polyamide and] water soluble or dispersible [salts thereof] *salt* having an average molecular weight of not greater than 50,000, the water soluble or dispersible salt being formed by the terminal carboxylic acid group, terminal amine group or both the terminal carboxylic acid and terminal amine groups of the polyamide.

16. An aqueous functional fluid composition according to claim 15 wherein the water soluble or dispersible salt of the water soluble or dispersible polyamide is a salt of the terminal carboxylic acid group of the polyamide and the water soluble or dispersible salt of the water insoluble polyamide is the salt of the terminal carboxylic acid group of the polyamide.

17. An aqueous functional fluid composition according to claim 15 wherein R is a $C_2$ to $C_{12}$ alkylene, $C_2$ to $C_{10}$ alkenylene, phenylene, $C_4$ to $C_6$ cycloaliphatic, mono to di($C_1$ to $C_4$ alkyl) substituted phenylene, phenyl substituted $C_2$ to $C_{10}$ alkylene, phenylene di($C_1$ to $C_3$ alkylene), heteroaliphatic having one to two oxygen or sulfur heterochain atoms and 2 to 10 carbon atoms, heterocyclic having one to two oxygen, sulfur or nitrogen hetero ring atoms and from 5 to 6 atoms in the ring divalent radical or a divalent radical residue obtained by removal of both carboxylic acid groups from a dimerized ethylenically unsaturated $C_8$ to $C_{26}$ fatty acid.

[18. An aqueous functional fluid composition according to claim 17 wherein the lubricant compound is the water soluble or dispersible polyamide.]

19. An aqueous functional fluid composition according to claim 17 wherein the lubricant compound is the water soluble or dispersible salt of the water soluble or dispersible polyamide.

20. An aqueous functional fluid composition according to claim 17 wherein the lubricant compound is the water soluble or dispersible salt of the water insoluble polyamide.

21. An aqueous functional fluid composition according to claim 19 or 20 wherein the [lubricant is the salt of the polyamide and said] salt is a salt of the terminal carboxylic acid group of the polyamide.

22. An aqueous functional fluid composition according to claim 21 wherein the salt is an alkali metal, ammonium or organic amine salt.

23. An aqueous functional fluid composition according to claim 22 wherein the organic amine is a mono, di or tri(alkanol) amine having 2 to 4 carbon atoms in the alkanol group.

24. An aqueous functional fluid composition according to claim 23 wherein the organic amine is the trialkanolamine.

25. An aqueous functional fluid composition in accordance with claim [18,] 19 or 20 wherein R′ is a divalent polyoxyalkylene homopolymer radical having an average molecular weight in the range of from 72 to 4000.

26. An aqueous functional fluid composition according to claim [18,] 19 or 20 wherein R′ is a divalent polyoxyalkylene copolymer radical having an average molecular weight of from 86 to 4000.

27. An aqueous functional fluid composition according to claim 23 wherein R is a $C_2$ to $C_{10}$ alkylene or $C_2$ to $C_{10}$ alkenylene radical.

28. An aqueous functional fluid composition according to claim 23 wherein R is a phenylene radical.

29. An aqueous functional fluid composition according to claim 23 wherein R is a divalent radical residue obtained by removal of both carboxylic acid groups from a dimerized ethylenically unsaturated $C_8$ to $C_{26}$ fatty acid.

30. An aqueous functional fluid composition according to claim 19 or 20 wherein the salt is a salt of the terminal amine group of the polyamide.

31. An aqueous functional fluid composition according to claim 17 wherein the lubricant compound is present in an amount in the range of from 0.01% to 99% by weight based on the total weight of the composition.

32. An aqueous functional fluid composition according to claim 31 wherein the amount of lubricant compound is in the range of from 0.01% to 20% by weight.

33. A metal working process comprising the step of working metal in the presence of the aqueous functional fluid composition according to claim 15.

* * * * *